(12) United States Patent
Braga et al.

(10) Patent No.: US 6,363,198 B1
(45) Date of Patent: Mar. 26, 2002

(54) OPTICAL FIBER CABLE DISTRIBUTION SHELF WITH CABLE MANAGEMENT SYSTEM

(75) Inventors: David J. Braga, Raleigh; David W. Kapella, Cary; Aditya K. Tariyal, Morrisville, all of NC (US)

(73) Assignee: Sumitomo Electric Lightwave Corp., Research Triangle Park, NC (US)

(*) Notice: Subject to any disclaimer, the term of this patent is extended or adjusted under 35 U.S.C. 154(b) by 0 days.

(21) Appl. No.: 09/519,708

(22) Filed: Mar. 7, 2000

(51) Int. Cl.[7] .............................................. G02B 6/00
(52) U.S. Cl. ...................................................... 385/134
(58) Field of Search ................................ 385/100–109, 385/134–135, 147, 22, 16

(56) References Cited

U.S. PATENT DOCUMENTS

| | | |
|---|---|---|
| 4,630,886 A | 12/1986 | Lauriello et al. |
| 4,708,430 A | 11/1987 | Donaldson et al. |
| 4,824,196 A | 4/1989 | Bylander |
| 4,832,436 A | 5/1989 | Goto et al. |
| 4,898,448 A | 2/1990 | Cooper |
| 4,995,688 A | 2/1991 | Anton et al. |
| 5,093,887 A | 3/1992 | Witte |
| 5,129,030 A | 7/1992 | Petrunia |
| 5,167,001 A | 11/1992 | Debortoli et al. |
| 5,335,349 A | 8/1994 | Kutsch et al. |
| 5,339,379 A | 8/1994 | Kutsch et al. |
| 5,490,229 A | 2/1996 | Ghandeharizadeh et al. |
| 5,497,444 A | 3/1996 | Wheeler |
| 5,511,144 A | 4/1996 | Hawkins et al. |
| 5,649,042 A * | 7/1997 | Pimpinella .................... 385/16 |
| 5,717,810 A | 2/1998 | Wheeler |
| 5,956,439 A * | 9/1999 | Pimpinella .................... 385/15 |
| 5,960,130 A * | 9/1999 | Jennings et al. ............ 385/135 |
| 6,256,445 B1 * | 7/2001 | Pimpinella .................... 385/15 |

OTHER PUBLICATIONS

ADC Telecommunications, "Fiber Cable Management Products," 2nd ed., p. 5, (Nov. 7, 1995).
SIECOR, "High–Density Frames," pp. 1–2, (No dated).
SIECOR, "Rack–Mountable LANscape Hardware System," pp. 24–25, (No dated).
SIECOR, "FDC Family," p. 1, (No dated).
SIECOR, "FiberManager System". (No dated).

* cited by examiner

Primary Examiner—Akm E. Ullah
(74) Attorney, Agent, or Firm—Jenkins & Wilson, P.A.

(57) ABSTRACT

An optical fiber cable distribution shelf is disclosed which comprises a cable management clip system in the rear bay as well as a cable management clip system in the front bay of the shelf. The cable management clip systems each include at least one pair of controlled bend clips and at least one divider clip positioned therebeneath in order to control the bend and to route optical fiber into and out of the cable distribution shelf without imparting any undesirable fiber damage or related attenuated signals due to uncontrolled bending of the fibers. Thus, the improved optical fiber cable distribution shelf provides for installing a higher density of fiber optic connections into an optical fiber cable distribution shelf.

20 Claims, 10 Drawing Sheets

OPTICAL FIBER CABLE DISTRIBUTION SHELF WITH CABLE MANAGEMENT SYSTEM

TECHNICAL FIELD

The present invention relates to optical fiber cable distribution shelves, and more particularly, the invention relates to an optical fiber cable distribution shelf with an improved cable management system.

RELATED ART

Optical fiber distribution frames are routinely used in telecommunications as an interface between optical fiber feeder and optical fiber distribution cables. The frames normally include two or more drawers or distribution shelves which each include a panel upon which is mounted an array of optical fiber connectors. Some optical fiber cable distribution shelves have been developed that have 144 fiber capacity rather than the more traditional 72 optical fiber capacity, but these enhanced capacity shelves typically suffer from bulky and difficult to manage optical fiber routing problems. This is particularly true with optical fiber cable distribution shelves having 144 optical fiber capacity and a standard height of 7.0 inches or 9.0 inches such as utilized in conventional optical fiber distribution frames.

DISCLOSURE OF THE INVENTION

The present invention provides an optical fiber cable distribution shelf with an improved cable management system to provide improved fiber routing management so as to render the cable distribution shelves simpler to integrate into existing systems while still maintaining a conventional height 9.0 inches or less. The novel cable distribution shelf of the invention is intended to fit standard 23.0 inch racks and to be compatible with existing 7.0 inch high, 17.0 inches wide, and 11.0 inch deep 72 or 96 optical fiber cable distribution shelves.

The cable distribution shelf with cable management clip system for connecting incoming optical fiber cables with fiber optic patch cords or similar fiber optic cables includes a housing having a divider wall that extends transversely therethrough to define a front bay and a rear bay. The divider wall defines two laterally spaced-apart apertures with a front clip panel therebetween in the front bay and with a rear clip panel therebetween in the rear bay. A first plurality of face plates are removably mounted to the divider wall so as to be positioned in the first divider wall aperture and substantially flush with the divider wall, and a second plurality of face plates are removably mounted to the divider wall so as to be positioned in the second divider wall aperture and substantially flush with the divider wall. A plurality of adapters are mounted to each of the first and second plurality of face plates wherein the adapters serve to connect incoming optical fiberconnectors to outgoing optical fiber connectors.

The cable distribution shelf further includes a novel front cable management clip system mounted to the front clip panel that includes at least one pair of laterally spaced-apart controlled bend clips that each have a collar portion and an inwardly and downwardly inclined arcuate ramp portion for receiving and bendingly guiding optical fiber from a corresponding one of the first or second plurality of face plates laterally inwardly and vertically downwardly along the front clip panel, and at least one divider clip including a plurality of laterally spaced slots wherein the divider clip is positioned beneath the pair of controlled bend clips for receiving downwardly extending optical fiber from at least one of the pair of controlled bend clips into a corresponding slot and guiding the optical fiber from the control bend clip vertically downwardly along the front clip panel towards the bottom of the cable distribution shelf.

The cable distribution shelf further includes a novel back cable management clip system mounted to the back clip panel that includes at least one pair of laterally spaced-apart controlled bend clips each having a collar portion and an inwardly and downwardly inclined arcuate ramp portion for receiving and bendingly guiding optical fiber from a corresponding one of the first or second plurality of face plates laterally inwardly and vertically downwardly along the back clip panel, and at least one divider clip comprising a plurality of laterally spaced slots wherein the divider clip is positioned beneath the pair of controlled bend clips for receiving downwardly extending optical fiber from at least one of the pair of control bend clips into a corresponding slot and guiding optical fiber from the controlled bend clip vertically downwardly along the back clip panel towards the bottom of the cable distribution shelf.

It is therefore an object of the present invention to provide an optical fiber cable distribution shelf with an improved optical fiber cable management system.

It is another object of the present invention to provide an optical fiber cable distribution shelf with an improved cable management system that provides for improved optical fiber routing management so as to render the cable distribution shelf simpler to integrate into existing systems.

It is another object of the present invention to provide a cable distribution shelf with an improved cable management system for enhanced cable management in both the front and back of the cable distribution shelf.

It is another object of the present invention to provide an optical fiber cable distribution shelf that provides or an increased density of fiber optic connections.

It is still another object of the present invention to provide a cable distribution shelf with an improved cable management system that provides for enhanced optical fiber cable management in order to control bending radius and relieve stress on optical fiber during its pathway leading into and from the cable distribution shelf.

It is still another object of the present invention to provide an optical fiber cable distribution shelf with an improved cable management system that provides controlled bending radius and minimal stress to optical fibers as they enter and leave the cable distribution shelf in order to avoid optical fiber damage and/or undesirable attenuated signal.

Some of the objects of the invention having been stated, other objects will become evident as the description proceeds, when taken in connection with the accompanying drawings described hereinbelow.

BEST MODE FOR CARRYING OUT THE INVENTION

Figure 1:
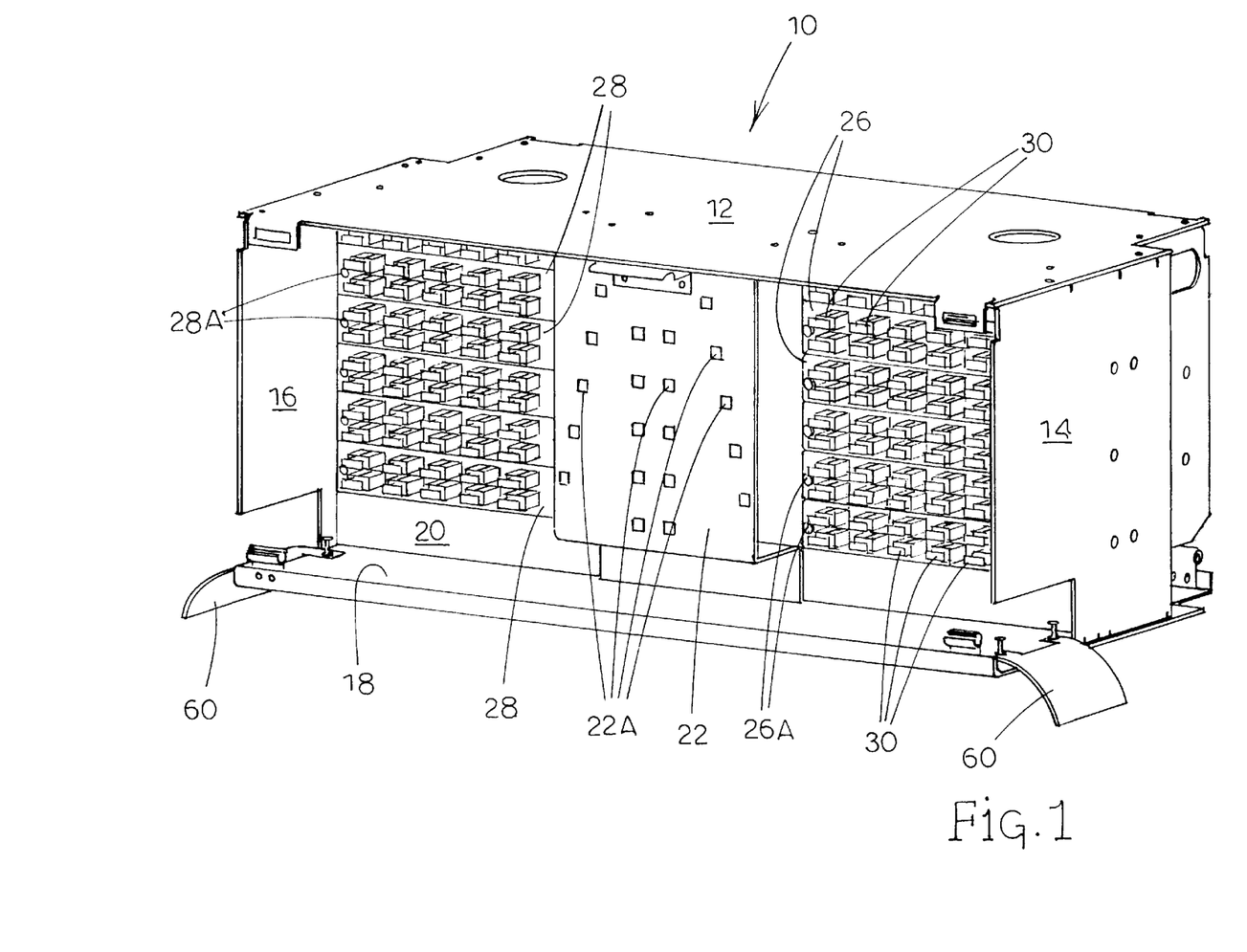
FIG. 1 is a perspective view of the front of a cable distribution shelf in accordance with the present invention with the detachable cable management clip system removed.
Figure 2:
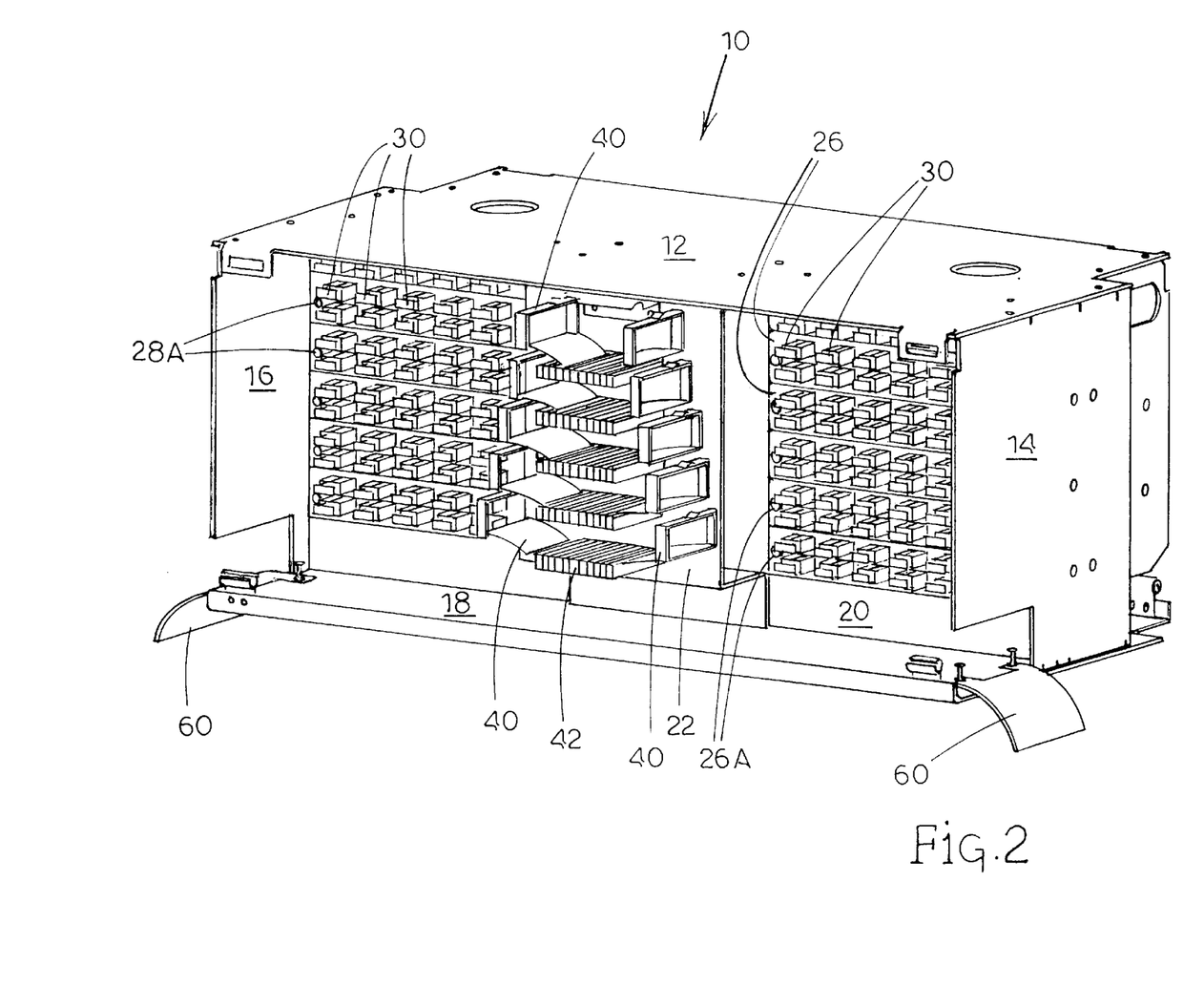
FIG. 2 is the cable distribution shelf shown in FIG. 1 with the cable management clip system attached thereto.
Figure 3:
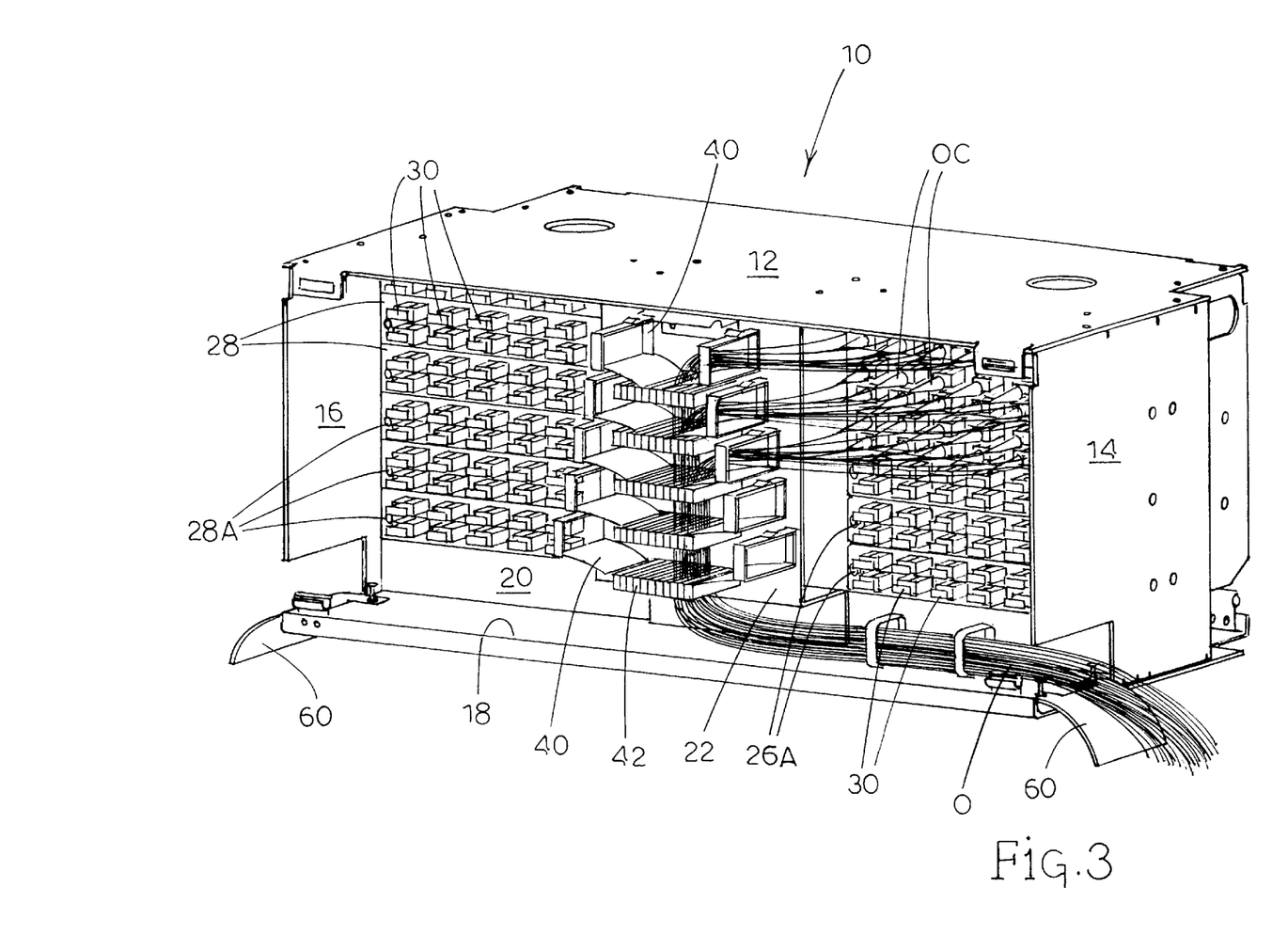
FIG. 3 is the cable distribution shelf shown in FIG. 1 with the cable management clip system attached thereto and with fiber optic cable connected thereto in order to illustrate the functioning of the cable management clip system.
Figure 4:
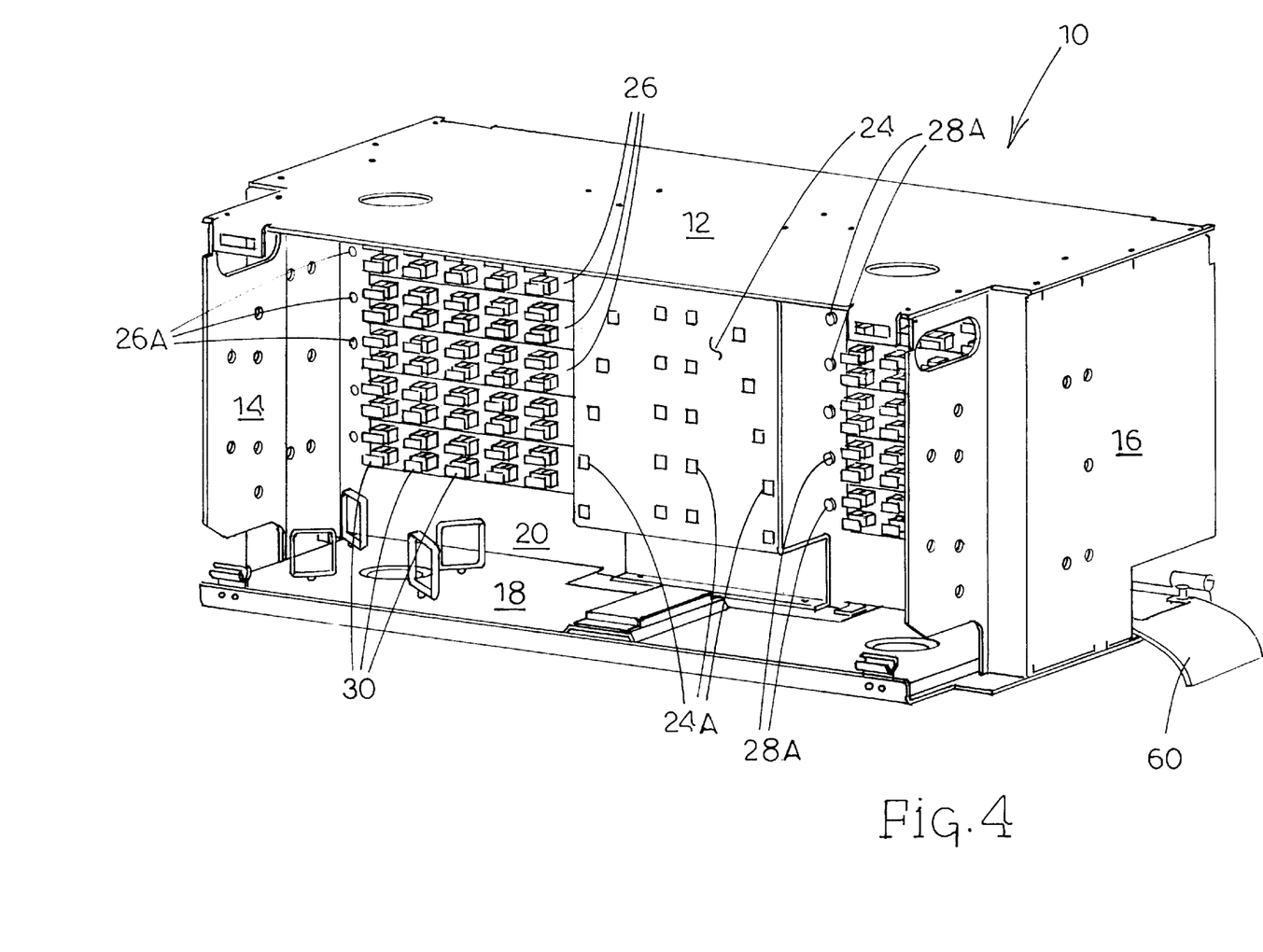
FIG. 4 is a perspective view of the back of a cable distribution shelf in accordance with the present invention with the detachable cable management clip system removed.
Figure 5:
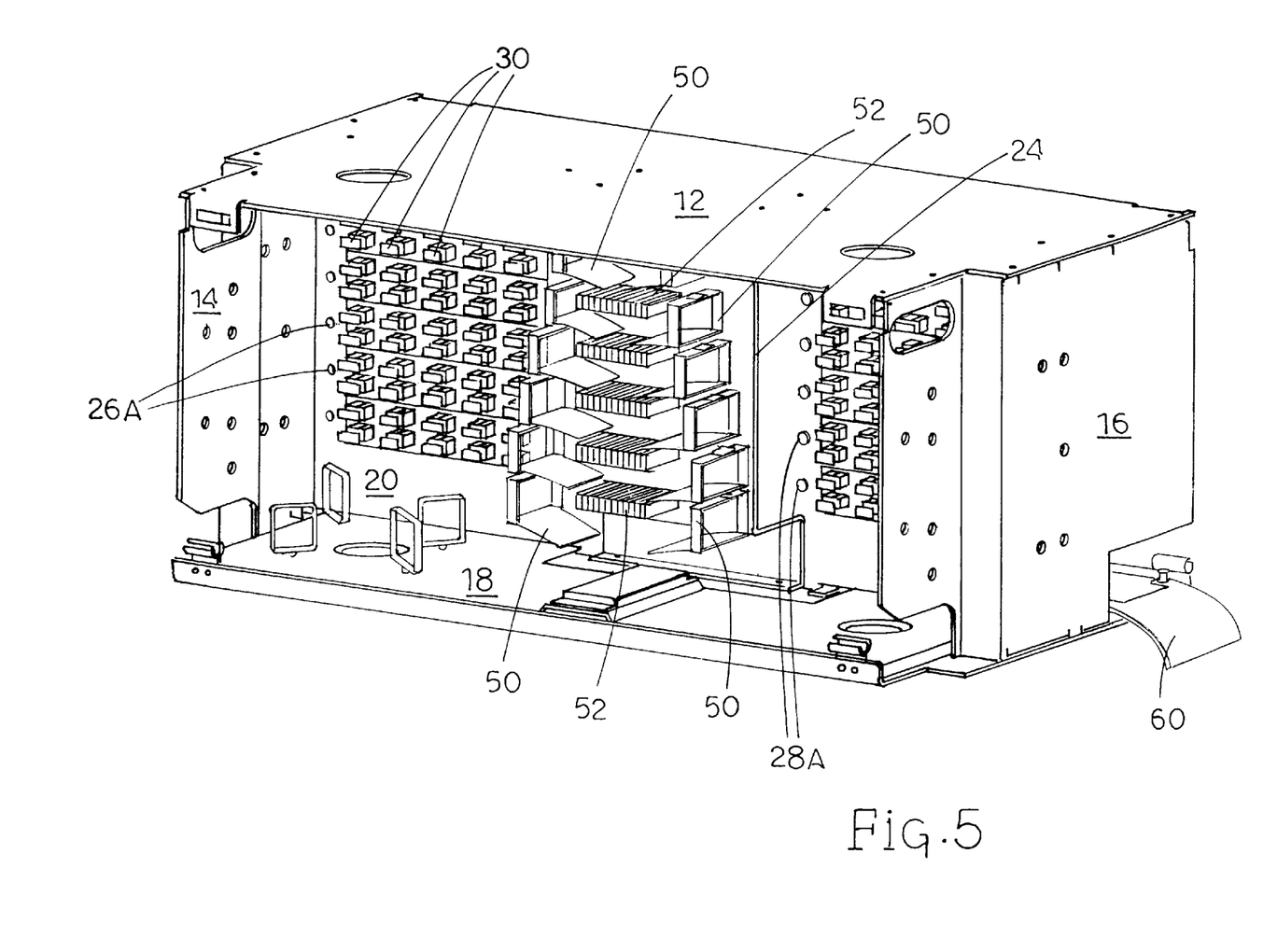
FIG. 5 is the cable distribution shelf shown in FIG. 4 with the cable management clip system connected thereto.
Figure 6:
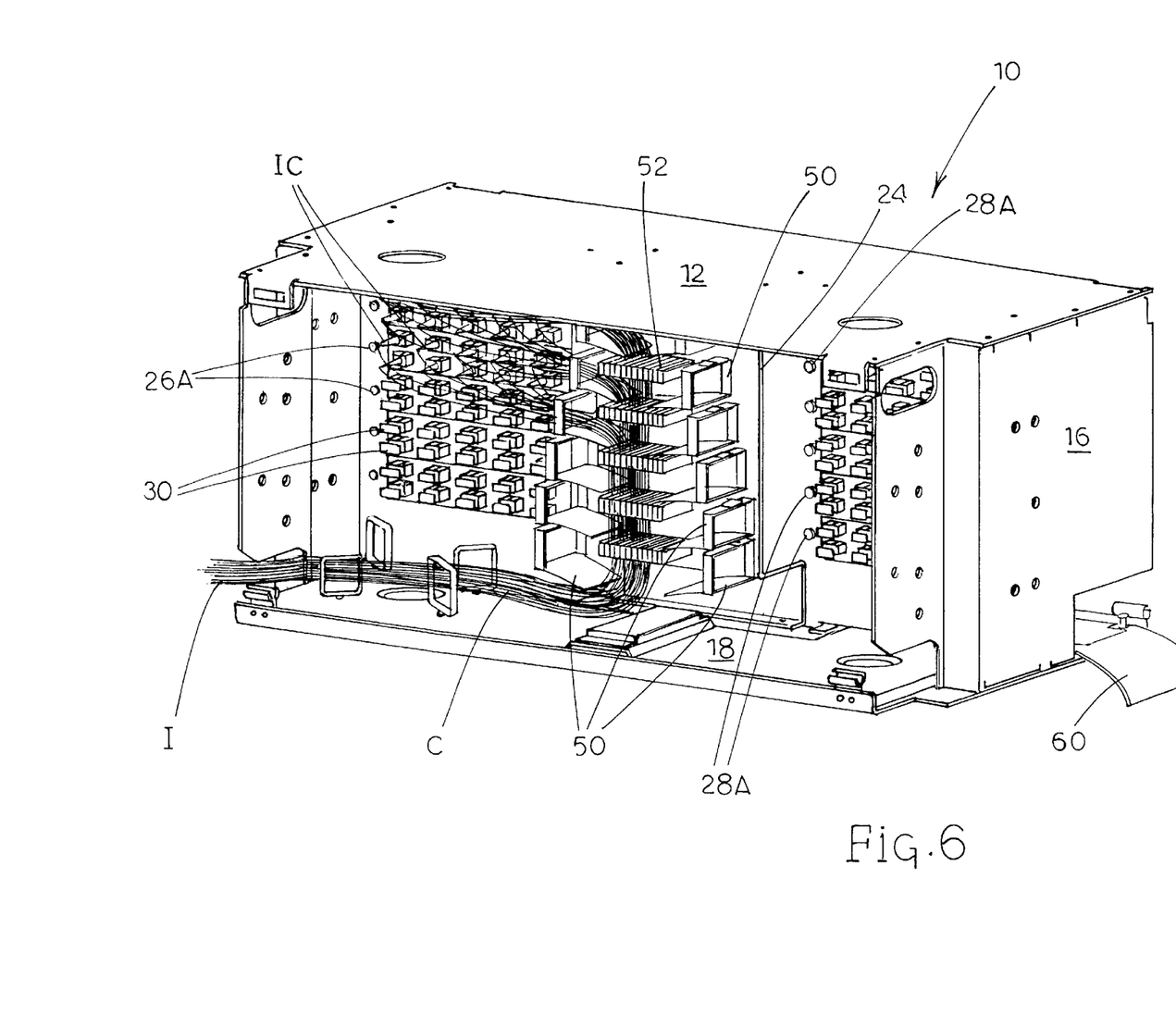
FIG. 6 is the cable distribution shelf shown in FIG. 4 with the cable management clip system attached thereto and with fiber optic cable connected thereto in order to illustrate the functioning of the cable management clip system.
Figure 7:
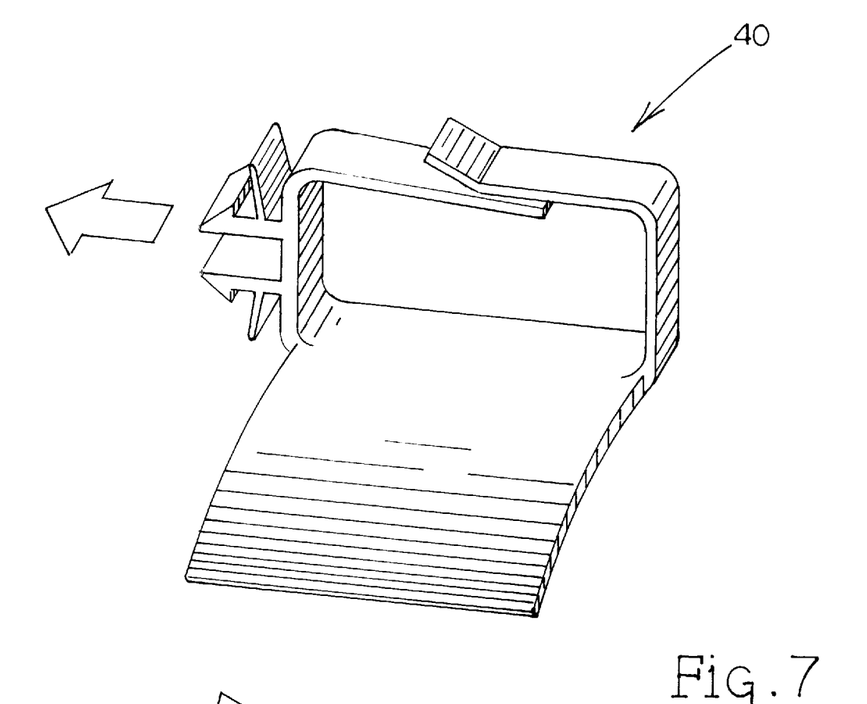
FIG. 7 is a perspective view of the controlled bend clip utilized in the cable management clip system.
Figure 8:
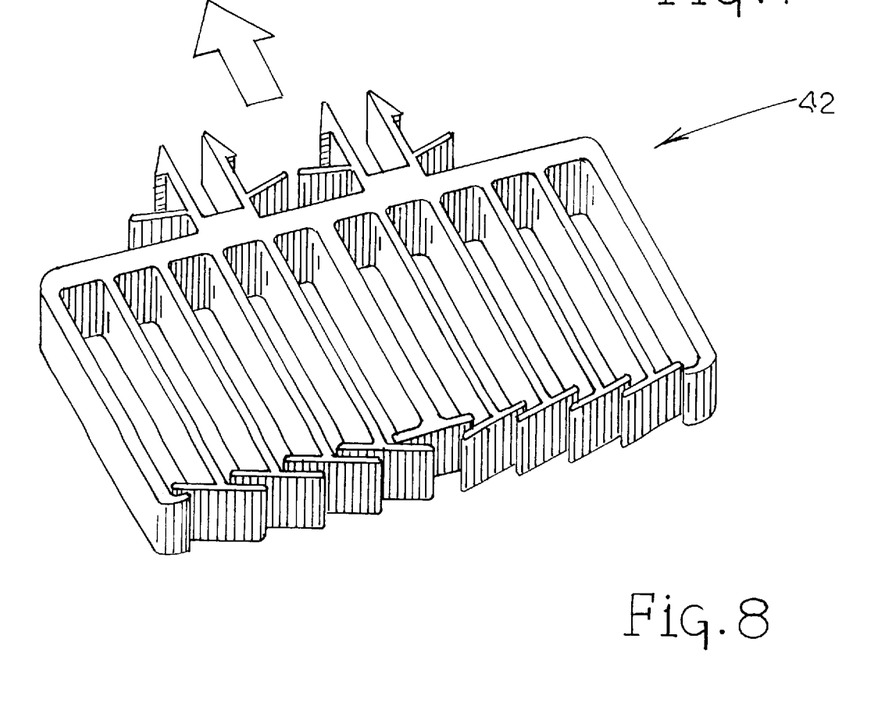
FIG. 8 is a perspective view of the finger clip utilized in the cable management clip system.
Figure 9:
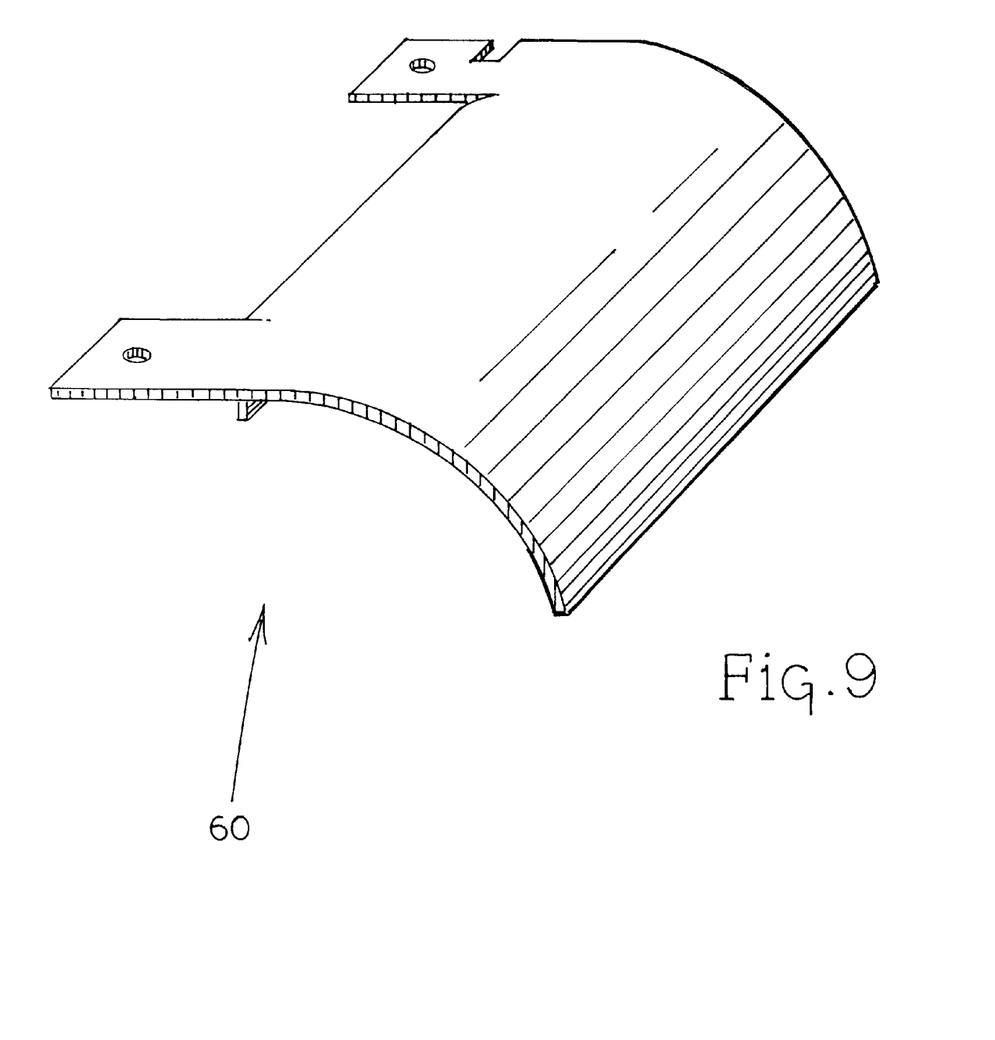
FIG. 9 is a perspective view of the optional output clip that can be used in combination with the cable management clip system.
Figure 10A:
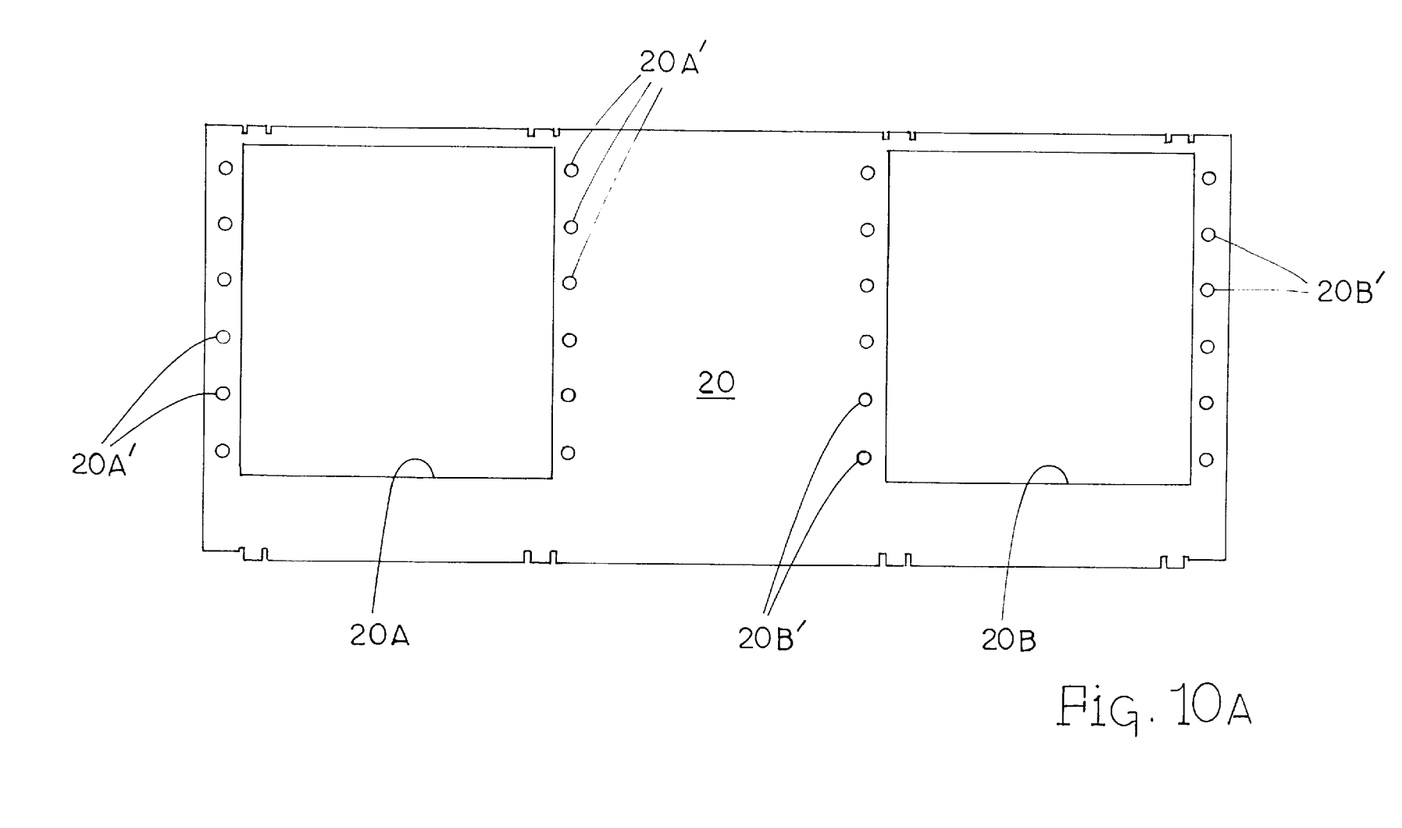
FIG. 10A is a front elevation view of the middle plate or divider wall of the distribution shelf shown in FIGS. 1–6.
Figure 10B:
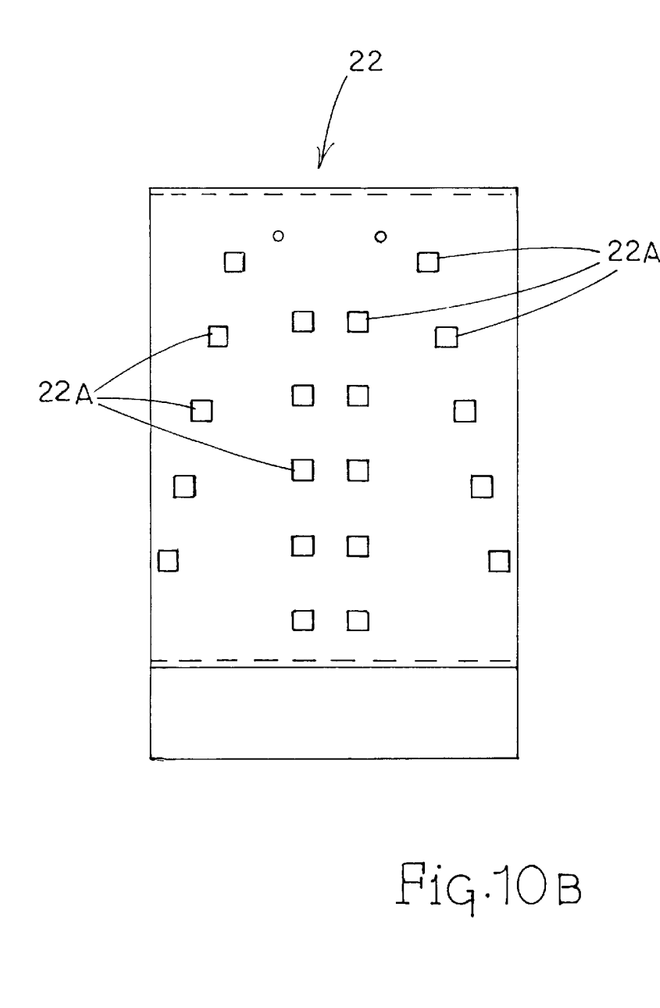
FIG. 10B is a front elevation view of the front clip panel that is attached to the front of the divider wall or middle plate shown in FIG. 10A.
Figure 10C:
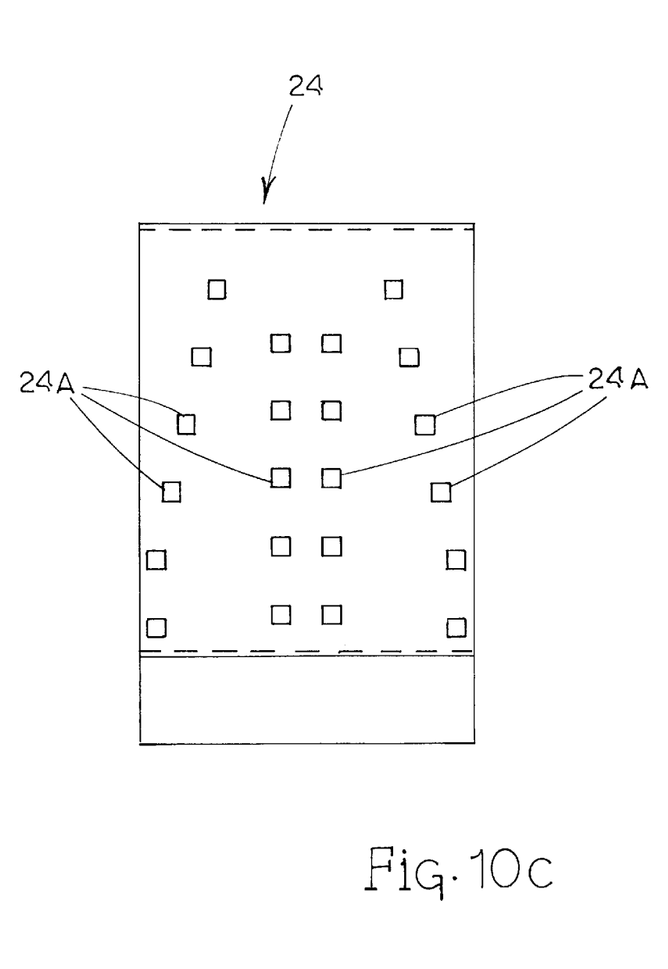
FIG. 10C is a front elevation view of the rear clip panel that is attached to the rear of the divider wall or middle plate shown in FIG. 10A.

Referring now to FIGS. 1 through 10A–10C of the drawings, a preferred embodiment of optical fiber cable distribution shelf with the cable management system of the present invention is shown and generally designated 10. Optical fiber cable distribution shelf 10 serves to connect incoming optical fiber cables with outgoing optical fiber cables. Shelf 10 includes top plate 12, right side plate 14, left side plate 16, bottom plate 18, and transversely extending middle plate or divider wall 20. Middle plate 20 defines a first four-sided aperture 20A in the side adjacent to left side wall 16 and a second four-sided aperture 20B laterally spaced-apart and adjacent to right side plate 14. A front clip panel 22 is positioned between the apertures 20A and 20B on the front of middle plate 20 and a rear clip panel 24 is positioned between apertures 20A and 20B on the back side of middle plate 20. Front clip panel 22 includes a plurality of apertures 22A therein and rear clip panel 24 includes a plurality of apertures 24A therein. Front clip panel 22 and rear clip panel 24 may be permanently or removably affixed to middle plate 20 as a matter of design choice.

As best seen in FIGS. 1–6, a first plurality of face plates 26 are removably mounted by means of plastic snaps 26A at each end thereof to two corresponding apertures 20B' extending along the length of the left and right side of four-sided aperture 20B. In this fashion, up to six face plates 26 can be removably mounted to apertures 20B' so as to extend across four-sided aperture 20B in divider wall 20. Each of the first plurality of face plates 26 is detachably mounted to middle plate 20 so as to be substantially flush with middle plate 20. Further, although six face plates 26 are shown as being mounted in aperture 20B of middle plate 20, cable distribution shelf 10 is intended for use by mounting any desired number of face plates 26 in aperture 20B between one and six face plates 26.

Also, cable distribution shelf 10 provides for detachable mounting of a second plurality of face plates 28 to divider wall 20 so as to be positioned in aperture 20A of divider wall 20 and be substantially flush with the divider wall. The second plurality of face plates 28 are detachably secured to divider wall 20 by plastic snaps 28A that extend through two corresponding apertures 20A' provided along opposing vertical sides of four-sided aperture 20A. Although six detachably mounted face plates 28 are shown in the drawings as mounted in apertures 20A' of middle plate 20, cable distribution shelf 10 is designed for detachably mounting any desired number of face plates 28 in four-sided aperture 20A between one and six face plates 28. As best seen in the drawings, each of face plates 26 in four-sided aperture 20B and each of face plates 28 in four-sided aperture 20A include a matrix of two by six (2×6) apertures (not shown) therein, respectively, in which are mounted optical fiber adapters 30. However, the 2×6 matrix of apertures is intended to be representative only since many other different matrix configurations of apertures in the base plates may be used. Although the number of adapters 30 utilized with each of the first plurality of face plates 26 and the second plurality of face plates 28 can be varied as a matter of choice, applicants contemplate that the preferred embodiment of optical fiber cable distribution shelf 10 will incorporate 12 adapters 30 mounted in each of both the first plurality of face plates 26 and the second plurality of face plates 28 so as to provide up to 144 optical fiber capacity as will be explained further hereinafter. Other configurations possible include the use of multiple fiber connectors to increase fiber capacity beyond 144 optical fibers.

Thus, the preferred embodiment of cable distribution shelf 10 includes 6 face plates 26 and 6 face plates 28 wherein each of the face plates includes a 2×6 matrix of 12 optical fiber adapters 30. An incoming optical fiber, ribbon, cord, etc. I from an optical fiber cable will be conducted along a pathway to be described hereinbelow and each fiber connected to an incoming optical fiber connector IC that will be connected to a corresponding one of adapters 30. Outgoing optical fibers are connected to outgoing optical fiber connectors OC that are each connected to a corresponding adapter 30 and connect to an outgoing fiber, cord, cable, etc. O either directly or by splice, and then extend out the rear of shelf 10. As best seen in FIGS. 1–6 of the drawings, an outgoing optical fiber connector OC is connected to the back side of a corresponding adapter 30 for each outgoing optical fiber that ultimately forms an outgoing fiber, ribbon, tube, cord, stub, or cable stub O departing from cable distribution shelf 10. With reference again to FIGS. 1–6 of the drawings, the novel fiber routing system will now be described wherein both incoming and outgoing fibers are routed towards the center of divider wall 20 of cable distribution shelf 10 and down the center cable management system that serves to maintain individual fibers in bundles of 12 and to control bending radius and relieve stress along the fiber pathway leading to adapters 30 and leading from adapters 30. The unique cable management system used in both the rear bay and front bay of cable distribution shelf 10 serves to avoid both fiber damage and attenuated signal due to uncontrolled extreme bending of fiber and/or too much stress upon fiber.

The cable management system utilized on front clip panel 22 in the front bay of cable distribution shelf 10 comprises at least one pair of laterally spaced-apart controlled bend clips 40 each having a collar portion and an inwardly and downwardly inclined arcuate ramp portion (see particularly FIG. 7) for receiving and bendingly guiding optical fiber from a corresponding face plate 26 or 28 laterally inwardly and vertically downwardly along front clip panel 22. Most suitably, controlled bend clips 40 are formed of plastic and provided with a snap for engaging a corresponding aperture 22A in front clip panel 22. The front cable management clip system also includes at least one divider clip 42 that defines a plurality of laterally spaced and open end slots therein.

Divider clip 42 is positioned beneath a corresponding pair of controlled bend clips 40 for receiving downwardly extending optical fiber from at least one of the pair of controlled bend clips 40 into a corresponding slot of divider clip 42 and guiding the optical fiber from controlled bend clip 40 along front clip panel 22 towards the bottom of cable distribution shelf 10.

Applicants contemplate that a divider clip 42 will be utilized with each pair of controlled bend clips 40 in order to provide controlled bending and routing of optical fiber into and out of cable distribution shelf 10 in order to control bending and relieve stress on the optical fiber so as to avoid fiber damage and/or attenuated signal due to uncontrolled bending of the optical fiber. Similar to controlled bend clips 40, divider clip 42 is preferably formed of plastic and is provided with a pair of snaps that engage a pair of apertures 22A in front clip panel 22. Although other numbers of controlled bend clips 40 and associated divider clips 42 can be used, applicants note that the cable distribution shelf 10 possesses a sufficient number of apertures 22A in front clip panel 22 to accommodate five pairs of controlled bend clips 40 and five corresponding divider clips 42 positioned immediately therebeneath on front clip panel 22 to provide improved fiber routing and control within cable distribution shelf 10.

Additionally, a back cable management clip system is provided similar to the previously described front management clip system consisting of at least one pair of laterally spaced-apart controlled bend clips 50 and at least one corresponding divider clip 52 formed substantially identically to the clips utilized on the front cable management clip system. Pairs of controlled bend clips 50 and corresponding divider clips 52 are removably mounted in apertures 24A provided in rear clip panel 24. Similar to the front cable management clip system, the rear cable management clip system can consist of as little as one pair of controlled bend clips 50 with a corresponding divider clip 52, but most suitably is provided with five pairs of controlled bend clips 50 and five corresponding divider clips 52 that are all detachably mounted to rear clip panel 24 in the rear bay of cable distribution shelf 10.

Cable distribution shelf 10 provides a modular concept wherein each 12 fiber ribbon fanout assembly (or 12 individual fibers, cords, cables, tubes, etc.) is individually routed in the rear while the corresponding front patch cords are separated into bundles of fibers intended to match the number of adapters. This allows for easy identification and easier access to broken fibers or connectors. All incoming fiber in the rear bay and outgoing fiber in the front bay is routed towards the center and down the middle of the rear clip panel 24 and front clip panel 22, respectively, and then horizontally outwardly towards the sides of cable distribution shelf 10. The 12 fiber pack modules are preferably installed horizontally since that numbering increases from left to right and then from top to bottom.

Thus, fibers in both the rear bay and front bay of cable distribution shelf 10 are routed towards the center and then down the rear clip panel and front clip panel, respectively, through compartmentalized rear routing clips 50 and 52 and front routing clips 40 and 42. Rear routing clips comprising controlled bend clips 50 and associated divider clips 52 as well as front routing clips comprising controlled bend clips 40 and corresponding divider clips 42 maintain individual fibers in bundles so as to provide a neater appearance, improved organization, and less tangling of fibers. The separation is achieved through the use of applicants' novel front and rear cable management clip system which allows for the routing of up to 144 fibers in bundles of up to 12. Moreover, in order to easily access any of fibers 1–144, access to one fiber will not force the need to disturb adjacent fibers in cable distribution shelf 10.

The front and rear cable management clip system provides rear controlled bend clips 50 and front controlled bend clips 40 to provide radius control as the optical fiber is transitioned from horizontal to vertical routing by controlled bend clips 50 and 40, respectively, which then route the fibers into compartmentalized divider clips 52 and 42, respectively. Controlled bend clips 50 and 40 are radiused (e.g., a bending radius greater than 1.25 inches so that a pull further along on the cord of optical fibers will not cause excessive bending loss at the point of entrance to controlled bend clips 50 and 40. Also, an optional radius control can be provided by removable output cord support clip 60 provided at each corner of the front bay of cable distribution shelf 10. Output cord support clips 60 are removably engaged to the bottom tray of the front bay of cable distribution shelf 10 by a pair of plastic snaps that engage a corresponding pair of apertures in the bottom of cable distribution shelf 10. Output cord support clips 60 provide a laterally extending arcuate ramp to provide additional bend control as the fiber cord exits cable distribution shelf 10.

Cable distribution shelf 10 with the novel cable management clip system can be used in many ways and to accommodate up to 144 optical fibers in a single cable distribution shelf. Typically, however, cable distribution shelf 10 contemplates an incoming optical fiber cable leading to shelf 10 and outgoing patch cords leading therefrom to individual telephone or computer systems in a manner well known in the fiber optic art.

Applicants again note that conventional cable distribution shelves familiar to those skilled in the art normally have a 72 optical fiber capacity although several manufacturers have developed 144 optical fiber capacity cable distribution shelves. However, none of the higher capacity cable distribution shelves known to applicants appear to satisfactorily address the issue of cable management in the front or rear or the issue of modularity. Typically, conventional 144 optical fiber capacity shelves are merely an extension of 72 optical fiber shelves with all of the 144 optical fibers routed together in a bulky and difficult to manage routing configuration.

Summarily, applicants' cable distribution shelf with cable management clip system of the present invention provides improved optical fiber routing management that renders shelf 10 easy to install and simple to integrate into existing systems. Distribution shelf 10 is constructed with a height less than 9.0 inches and utilizes a modular design wherein each optical fiber, ribbon, cord, or tube is individually routed into the rear and the front optical fiber cords are separated therefrom to allow for easy identification and access to broken fibers or optical fiber connectors by a technician.

Further, applicants' cable distribution shelf 10 provides for ease of accessibility to both the front of the cable shelf and the rear of the cable shelf. Applicants' cable distribution shelf utilizes a novel cable management clip system in the rear bay and a similar novel cable management clip system in the front bay in order to control bending and route fibers during their pathway in the rear bay to centrally mounted adapters and their pathway from the centrally mounted adapters through the front bay of the cable distribution shelf. By controlling the bending radius and relieving stress on the fiber, the cable distribution shelf provides unexpectedly and surprisingly superior avoidance of fiber damage and/or attenuated signal transmission due to uncontrolled bending of the fibers.

It will be understood that various details of the invention may be changed without departing from the scope of the invention. Furthermore, the foregoing description is for the purpose of illustration only, and not for the purpose of limitation--the invention being defined by the claims.

What is claimed is:

1. A cable distribution shelf for connecting incoming optical fiber cables with fiber optic patch cords or similar fiber optic cables, said cable distribution shelf comprising:

(a) a housing having a divider wall extending transversely therethrough so as to define a front bay and a rear bay therein;

(b) said divider wall defining at least two laterally spaced-apart apertures therein with a front clip panel therebetween in the front bay and a rear clip panel therebetween in the rear bay;

(c) a first plurality of face plates being removably mounted to said divider wall so as to be positioned in the first divider wall aperture and substantially flush with said divider wall;

(d) a second plurality of face plates being removably mounted to said divider wall so as to be positioned in the second divider wall aperture and substantially flush with said divider wall;

(e) a plurality of adapters being mounted to said first and second plurality of face plates, said adapters serving to connect incoming optical fiber connectors to outgoing optical fiber connectors;

(f) a front cable management clip system mounted to said front clip panel and comprising:

(i) at least one pair of laterally spaced-apart controlled bend clips each having a collar portion and an inwardly and downwardly inclined arcuate ramp portion for receiving and bendingly guiding optical fiber from a corresponding one of said first or second plurality of face plates laterally inwardly and vertically downwardly along said front clip panel; and (ii) at least one divider clip comprising a plurality of laterally spaced slots, said divider clip being positioned beneath said pair of controlled bend clips for receiving downwardly extending optical fiber from at least one of said pair of controlled bend clips into a corresponding slot and guiding optical fiber from said controlled bend clip vertically downwardly along said front clip panel towards the bottom of said cable distribution shelf; and (g) a back cable management clip system mounted to said back clip panel and comprising:

(i) at least one pair of laterally spaced-apart controlled bend clips each having a collar portion and an inwardly and downwardly inclined arcuate ramp portion for receiving and bendingly guiding optical fiber from a corresponding one of said first or second plurality of face plates laterally inwardly and vertically downwardly along said front clip panel; and (ii) at least one divider clip comprising a plurality of laterally spaced slots, said divider clip being positioned beneath said pair of controlled bend clips for receiving downwardly extending optical fiber from at least one of said pair of controlled bend clips into a corresponding slot and guiding optical fiber from said controlled bend clip vertically downwardly along said back clip panel towards the bottom of said cable distribution shelf.

2. The cable distribution shelf according to claim 1, wherein said housing is constructed so that the front bay and the rear bay can be easily accessed from the front or rear, respectively, of said housing.

3. The cable distribution shelf according to claim 1, wherein said divider wall defines two laterally spaced-apart apertures therein and wherein each of said two laterally spaced-apart apertures has a width that substantially corresponds to the width of a corresponding one of said first and second plurality of face plates.

4. The cable distribution shelf according to claim 1, wherein said first plurality of face plates comprises 6 face plates.

5. The cable distribution shelf according to claim 1, wherein said second plurality of face plates comprises 6 face plates.

6. The cable distribution shelf according to claim 1, wherein said plurality of adapters mounted to a face plate comprises 12 optical fiber adapters.

7. The cable distribution shelf according to claim 1, wherein said front and rear cable management clip systems each comprise:

(i) a plurality of vertically spaced pairs of controlled bend clips; and (ii) a plurality of vertically spaced divider clips wherein a plurality of said divider clips are associated with a corresponding plurality of said pairs of controlled bend clips.

8. The cable distribution shelf according to claim 7, wherein each sequential pair of said controlled bend clips is positioned laterally further apart than the preceding pair of said controlled bend clips progressively from top to bottom of their vertical placement on said divider wall so as to position optical fiber in the medial portion of the uppermost divider clip and sequentially further outwardly in sequentially lower vertically spaced divider clips.

9. The cable distribution shelf according to claim 1, wherein the bending radius of said controlled bend clips is greater than 1.25 inches.

10. The cable distribution shelf according to claim 1, wherein said divider clips each comprise 10 laterally spaced slots defined by said outwardly extending finger elements.

11. A cable distribution shelf for connecting incoming optical fiber cables with fiber optic patch cords or similar fiber optic cables, said cable distribution shelf comprising:

(a) a housing having a divider wall extending transversely therethrough so as to define a front bay and a rear bay therein;

(b) said divider wall defining two laterally spaced-apart apertures therein with a front clip panel therebetween in the front bay and a rear clip panel therebetween in the rear bay;

(c) a first plurality of face plates being removably mounted to said divider wall so as to be positioned in the first divider wall aperture and substantially flush with said divider wall;

(d) a second plurality of face plates being removably mounted to said divider wall so as to be positioned in the second divider wall aperture and substantially flush with said divider wall;

(e) a plurality of adapters being mounted to said first and second plurality of face plates, said adapters serving to connect incoming optical fiber connectors to outgoing optical fiber connectors;

(f) a front cable management clip system mounted to said front clip panel and comprising:

(i) a plurality of vertically spaced pairs of laterally spaced-apart controlled bend clips each having a collar portion and an inwardly and downwardly inclined arcuate ramp portion for receiving and bendingly guiding optical fiber from a corresponding one of said first or second plurality of face plates laterally inwardly and vertically downwardly along said front clip panel; and (ii) a plurality of vertically spaced divider clips comprising a plurality of laterally spaced slots, said divider clip being positioned beneath a plurality of pairs of controlled bend clips for receiving downwardly extending optical fiber from at least one of said pair of controlled bend clips into a corresponding slot and guiding optical fiber from said controlled bend clips vertically downwardly along said front clip panel towards the bottom of said cable distribution shelf; and g. a back cable management clip system mounted to said back clip panel and comprising:

(i) a plurality of vertically spaced pairs of laterally spaced-apart controlled bend clips each having a collar portion and an inwardly and downwardly inclined arcuate ramp portion for receiving and bendingly guiding optical fiber from a corresponding one of said first or second plurality of face plates laterally inwardly and vertically downwardly along said front clip panel; and (ii) a plurality of vertically spaced divider clips comprising a plurality of laterally spaced slots, said divider clips being positioned beneath a plurality of pairs of controlled bend clips for receiving downwardly extending optical fiber from at least one of said pair of controlled bend clips into a corresponding slot and guiding optical fiber from said controlled bend clips vertically downwardly along said back clip panel towards the bottom of said cable distribution shelf.

12. The cable distribution shelf according to claim 11, wherein said housing is constructed so that the front bay and the rear bay can be easily accessed from the front or rear, respectively, of said housing.

13. The cable distribution shelf according to claim 11, wherein each of said two laterally spaced-apart apertures has a width that substantially corresponds to the width of a corresponding one of said first and second plurality of face plates.

14. The cable distribution shelf according to claim 11, wherein said first plurality of face plates comprises 6 face plates.

15. The cable distribution shelf according to claim 11, wherein said second plurality of face plates comprises 6 face plates.

16. The cable distribution shelf according to claim 11, wherein said plurality of adapters mounted to a face plate comprises 12 optical fiber adapters.

17. The cable distribution shelf according to claim 11, wherein each sequential pair of said controlled bend clips is positioned laterally further apart than the preceding pair of said controlled bend clips progressively from top to bottom of their vertical placement on said divider wall so as to position optical fiber in the medial portion of the uppermost divider clip and sequentially further outwardly in sequentially lower vertically spaced divider clips.

18. The cable distribution shelf according to claim 11, wherein the bending radius of said controlled bend clips is greater than 1.25 inches.

19. The cable distribution shelf according to claim 11, wherein said divider clips each comprise 10 laterally spaced slots defined by said outwardly extending finger elements.

20. The cable distribution shelf according to claim 11, wherein said front bay of said housing defines an aperture in each opposing side thereof adjacent the bottom of said housing, and an output cord support clip is provided in each aperture and each of said support clips comprises an outwardly and downwardly extending arcuate ramp portion.

* * * * *